April 21, 1942.  J. STURGESS  2,280,105
CABLE TENSION GOVERNOR
Filed Jan. 13, 1940
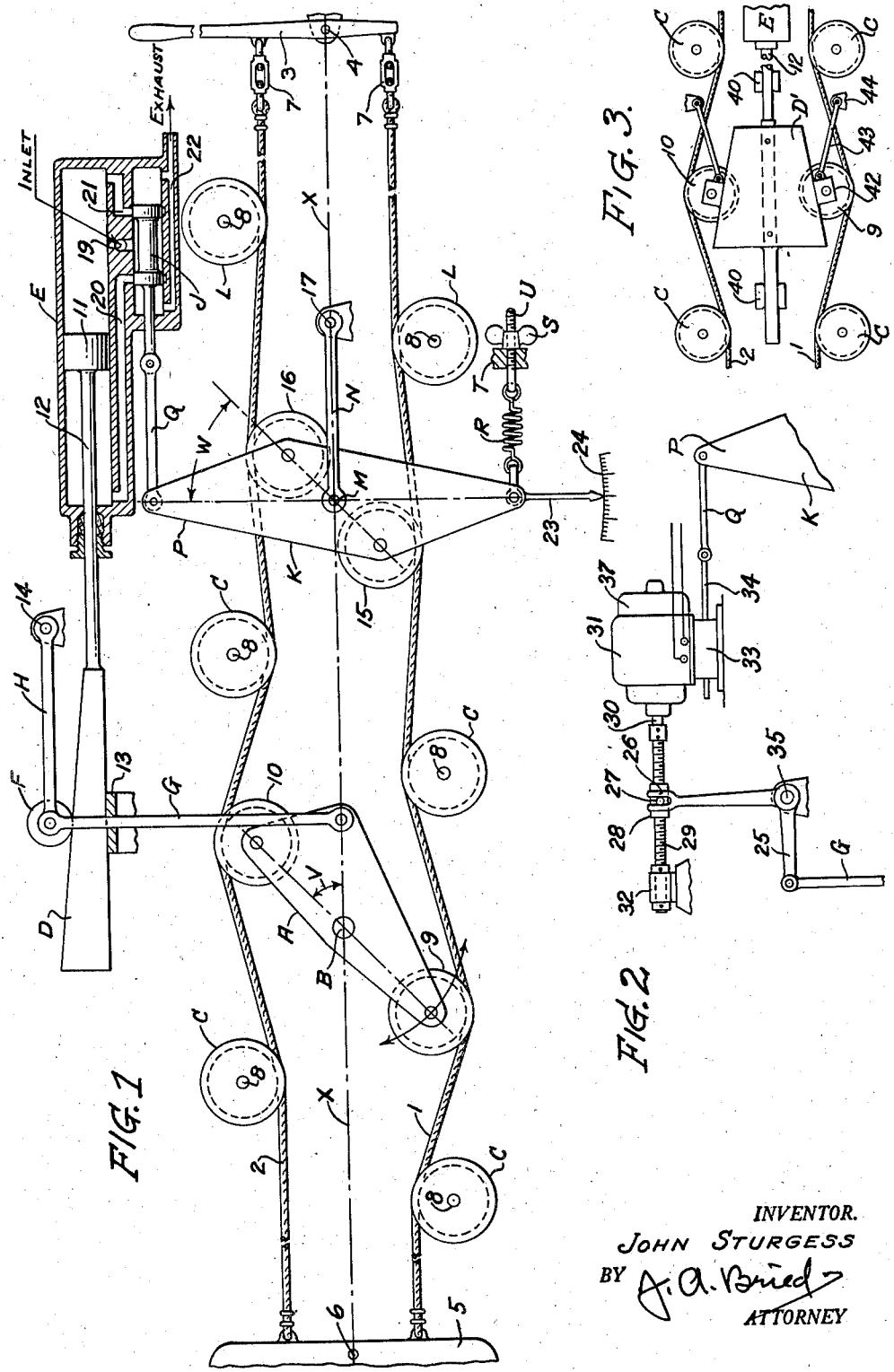
INVENTOR.
JOHN STURGESS
BY
ATTORNEY Patented Apr. 21, 1942

2,280,105

UNITED STATES PATENT OFFICE 2,280,105

CABLE TENSION GOVERNOR

John Sturgess, Glendale, Calif., assignor to Sturgess, Inc., Los Angeles, Calif., a corporation of California Application January 13, 1940, Serial No. 313,802

17 Claims. (Cl. 74—501)

This invention relates to control cables of aircraft and other structures wherein pairs of cables under tension are employed for moving a work member such as a rudder, aileron, engine controls, and other auxiliaries, to various positions back and forth from the manipulation of a control element or member operated by the pilot or other operative.

The principal object of the invention is to provide means for automatically maintaining any predetermined or initially set tension in such a pair of control cables.

A further object of the invention is to provide means as immediately above set forth which will automatically maintain the initially set tension in such a pair of cables regardless of stretch in the cables, or shrinkage thereof or apparent shrinkage or contraction due to expansion or elongation of the supporting structure, such as an aircraft fuselage or frame, or wear of cables, guide pulleys, distortion of brackets, etc.

A further object of the invention is to provide an automatic cable tension control apparatus which does not require the parting or severance of a cable or cables in order to operate or be placed at any intermediate point as an element of the cables length, but such an apparatus which will operate on a pair of integral or continuous cables both at all times permanently connected at their ends respectively to the work member and to the pilot control element.

A further object of the invention is to provide an apparatus as above outlined which will not impair or interfere with manual or pilot control at any time, even if the automatic apparatus itself should fail or become inoperative.

A still further object of the invention is to provide an automatic cable tension maintaining apparatus which will maintain the initial set tension in a pair of control cables without being affected by temporary changes in tension of one of the cables as compared with the other due to operating the control, wind reactance on the work member, etc., and which would greatly increase the tension on the pulling cable of the pair while slacking off the tension on the opposite cable of the pair.

Other features and advantages of the invention will appear in the following description and accompanying drawing:

In the drawing:

Fig. 1 is a general layout showing a pair of control cables connected at the ends respectively to the work member and to the pilot control member, with my automatic tension control apparatus applied to the cables, and hydraulically operated. Some of the mechanism is shown partly in section.

Fig. 2 is a detail showing an electric motor actuator in place of the hydraulic actuator shown in Fig. 1.

Fig. 3 is a reduced size drawing showing a modified arrangement of the tension adjusting pulleys.

Before describing the drawing in detail an outline of the requirements to be met and general functioning of the invention will be given so as to make the operation of the elements shown in the drawing more readily understandable.

Aircraft control-cables are rigged in pairs respectively at one end each at opposite sides of the pivotal point of a rockable, pilot's controlling element, such as a pedal, wheel, or "stick," and at the other ends to the rockable work member or control surface of the craft, the cables being initially made equally taut to insure motions of the pilot's control apparatus being definitely transmitted to the control-surface or other work member. The degree of tension of the cables is set out in engineering specifications, based on Department of Commerce, and other authorities' requirements. If rigged too tight, undesirable resistance is imposed on the pilot's actions, and if too loose the response of the control-surfaces is sluggish and unreliable. Furthermore, the vibration-frequency of the surface members is affected by the cable-tension, and this frequency is a matter of great importance and subject to rigid specifications and test.

But even if the cables are correctly rigged in the factory or at the hanger, the tension will subsequently vary over a wide range due to the unequal expansion, under varying temperatures, of the duralumin airplane structure and the steel cables. Deflection, stretch of the cables and wear of guide pulley structures also affect the cable-tension, these influences defeating attempts to maintain the initially rigged specified tension. Of these influences, temperature changes are the most potent.

No practical solution of this difficulty has heretofore been found, though its seriousness is recognized. Such research as has been made has been in the direction of thermostatic apparatus, as being the most obvious remedy. But thermostatic apparatus has thus far been found impracticable for use on airplanes, for several reasons, and particularly as difficulty arises as to where to place the thermostat so that the location shall represent the average temperature of the airplane. Other efforts have been in the direction of sheathing the cables with Dural.

My invention solves the problem by using the tension of the cables themselves to actuate means for increasing or decreasing their tension as might become necessary to maintain it constant. But in order to accomplish this a great difficulty had to be overcome, for while we speak of the rigged tension (that is the tension when the airplane is on the ground) yet that tension does not prevail during flight. The tension is constantly varying by reason of the reaction of the control surfaces to air pressure.

Two cables are used for each such surface on opposite sides of the rocking pivots, rigged to a definite tension when the airplane is not in flight. But during flight one of the pair is subject to a higher tension, and the other to a lower tension, according to the degree of movement of the control surfaces and other causes such as speed, wind, rate of banking, turning, etc. In extreme cases the loaded cable will carry a tension several times the initial tension, while the unloaded cable may be substantially slack. It will, therefore, be seen that any automatic tension control method actuated by the existing cable-tension itself must provide for the foregoing condition,—at first seemingly impossible.

It was, therefore, necessary to devise apparatus which would function in response only to the initial tension component of the total tension and not function in response to temporary additional loads (live loads) occasioned by moving the pilot's controls even if the temporary changes were of long duration,—possibly the entire period of the flight. It must also be irresponsive to the operative travel or movements of the cables.

My invention accomplishes all this in a simple manner, and its effectiveness has been proven by actual tested construction.

The invention comprises a series of guide pulleys and lever pulleys mounted in a special manner in relation to a pair of control cables, and a power actuator, preferably hydraulic or electric.

The arrangement is such that movement imparted to one or more pulleys (hereafter called the "tension-adjusting pulleys") by the power actuator tightens or slackens the cables according to the direction of movement. The mounting of another one or more pulleys (hereinafter called the "tension-indicating pulleys") is such that variation in the tension of the two cables acting on these latter pulleys causes movement of the lever carrying these pulleys, which movement controls the movements of the power actuator. If an electric motor is used for power, the movement of the pulley lever will actuate contacts. If hydraulic, the said movement will actuate suitable distributing valves. When the power actuator moves the "tension-adjusting pulleys"—either to increase or decrease the tension in the control cables, this increase or decrease in tension is at once "felt" by the "tension-indicating pulleys" so that when it arrives at a value equal to the total initially set tension of the two cables, the resulting movement of the lever carrying the tension-indicating pulleys shuts off the power actuator, or rather brings it to neutral position with the "tension-adjusting pulleys" locked in their new position until the actuator is again moved either to further increase the tension or reduce it, as the conditions (effective cable pressure on the tension-indicating pulleys) may prescribe, to maintain the initially set tension.

Now with reference to the drawing:

No detail of the aircraft structure, nor the usual guide pulleys for the cables are shown, but only such guide pulleys as contribute to the operation of the invention, it being understood that the cables may be run through various turns over any number of other guide pulleys as may be required to operate any desired rockable moving part or surface member of the craft.

The control cables shown are designated 1 and 2 and are indicated as permanently connected at one end each to a rockable control element 3 at opposite sides of its fixed pivotal support 4, and similarly at its opposite ends to a rockable work member 5 at opposite sides of its fixed pivotal support 6. Turn buckles 7 or common threaded anchor bolts at the end of the cables, or their equivalent may be used for adjusting the cables to the initial tension desired.

A series of grooved guide pulleys, C, C, C, C and L, L, are shown spaced equally from opposite sides of a center line X between the two cables.

The idler guide pulleys bear against the outermost sides of the cables and are each revolvably supported on pivots 8 fixed in relation to the body of the aircraft, and against the thus definitely spaced cables my control operates. Some of the guide pulleys shown may of course be those ordinarily required for operative guidance of the cables.

The tension-adjusting pulleys 9, 10 are pivotally mounted on a bracket lever A pivoted centrally at B to a fixed point. The center line of the bracket, through the two pulleys, lies at an angle V of approximately 45 degrees to the cables, and each pulley is in contact with opposite cables. The pivot, B, is midway between the two pulleys. The four fixed idler guide pulleys, C, are arranged on both sides of the pivoted bracket A. The spacing of the six pulleys relative to the pulleys 9, 10, being such as to create an offset in each cable, thereby shortening their overall length an amount depending on the angular position of the pivoted bracket lever.

Movement of the pivoted bracket lever is accomplished by the power actuator, shown in Fig. 1 as a double acting hydraulic cylinder E containing a piston 11 at the inner end of a piston rod 12.

Since the required movement of the bracket lever to vary the cable tension is small, and the movement of the hydraulic piston (or electric motor, if used) is relatively long, a motion reducing mechanism is necessary. The simplest, and preferred form is a wedge, attached to the piston rod (or reducing motion if electric-motor). This wedge is shown at D slidable on a fixed support 13, and a shoe, or roller, F, riding on the wedge, transmits the reduced motion to the pulley-bracket by means of suitable links, G, while other links, H, pivoted at one end to the roller and at the other end to a fixed point 14 hold the shoe, or roller, in proper position while permitting motion of the roller substantially normal to the wedge.

The degree of offset to the cables must be such that maximum expansion of the fuselage permits some of the offset to remain when the tension-adjusting pulleys are in the tight cable position, while the degree of motion imparted by the wedge to the pulley bracket must be such as to provide for the full range of expansion as well as sufficient provision for wear on stretch of cables.

The mounting of the tension-indicating pulleys 15—16 is an important part of my invention since this mounting solves the problem set up due to the varying loads on the cables. These pulleys 15 and 16 are mounted on a bracket-lever, K, pivoted at M between fixed pulleys, C and L, so that one is in contact with each of the cables of a pair.

The center line of the bracket lever K, taken through the two pulleys, normally lies at about an angle W of approximately 45 degrees to the cables. This bracket-lever is pivoted at M, not a fixed pivot like the tension-adjusting pulley-bracket, but instead, the pivot M is carried by movable links, N, set parallel to the cables and pivoted to a fixed point 17. Thus the pivot, M, cannot move in the longitudinal direction of the cables, but is free to move at right angles thereto.

An extended arm P, of the bracket-lever K standing at about right angles to the cables is pivotally connected by a link, Q, to a balanced piston-valve J, whose movement controls the movement of the hydraulic piston. A stout tension spring, R, attached to the opposite end of bracket-lever K tends to create offsets in the cables, in opposite directions, which offsets are a measure of the tension in the cables, as determined by the tension of the spring. The offsets should be relatively small, and the spring short and stiff, so as not to introduce a resilient element in the cables.

In the operation of the hydraulic actuator, liquid under pressure from any suitable source such as a constant operating oil pump not shown, carried on the aircraft, is admitted to the inlet port 19 to the central reduced portion of the piston valve J which normally seals off both ports 20, 21 leading respectively to opposite ends of the cylinder E. A movement of the piston valve J from the central position simultaneously opens either port 20 or 21, as the case may be, to exhaust port 22, and opens the other port to the liquid under pressure from inlet port 19. Thus the piston is impelled in one direction by the incoming liquid at one side of the piston, while the liquid from the other side escapes through exhaust port 22 back to the pressure source for use again.

In operation of my cable tensioning governor as above described, when no live load is on the cables, and they only are exposed to their initial, or rigging tension, the offsets in the two cables are substantially equal and the pulley bracket K, or rather its pivotal point M lies in mid-position between the cables, and the linkage of the bracket to the piston valve J is such that the latter is also in mid-position, and at which both fluid passages to the two ends of the cylinder E are closed, so that the piston is hydraulically locked, thus holding the tension-adjusting pulley-bracket lever, A, in a fixed position. This is the condition when the initial tension is correct and even on both cables. To insure this position of the piston valve under the initial tension of the cables, means is provided for adjusting the tension of spring R, here shown as an adjusting nut S bearing against a fixed stop T and engaging a threaded anchor bolt U to which the end of the spring is hooked.

If the initial tension of the cables increases, such as by expansion of the fuselage etc., from heat, the component of the triangular offset, acting against the spring, preponderates over the latter, and slightly rotates the bracket K. This motion is transmitted to the piston-valve, through the linkage described, moving it from its mid-position to the right and opens the valve ports to admit fluid pressure to the right hand side of the piston, and release to exhaust the opposite side. The resulting movement of the piston, and attached wedge and linkage, rotates the pivoted bracket, A, so as to diminish the offset in the cables sufficient to restore the tension to its original value. As this occurs the pivoted bracket, K, responds by returning to its mid-position, and the mechanism again becomes hydraulically locked.

If the initial tension decreases, the opposite actions occur, with the same result.

The foregoing description of operation, disregards any intermittent live load on the cables, such as would be set up in service.

If such additional load occurs, it will increase the load on one cable of the pair, and diminish it on the other cable. If the initial tension in both cables is 100 lbs., and the pilot applies a load at his controls to increase the tension on the loaded cable to 150 lbs., the opposite cable will have its tension diminished to 50 lbs. Or if he exerts a load of 200 lbs. on one of the cables, the tension on the two cables will be 200 lbs. and 0 lbs. respectively, and neither of these conditions (or any other load that might be applied) must cause the governor to operate.

The tighter cable will have its offset at the tension-indicator pulleys 15 and 16 diminished, but the offset of the slacker cable will be increased because the spring R applied its effort merely to separate the two cables, and the pulley bracket-lever K as a whole, assumes a position midway between the two offsets,—the lesser and the greater, which it can readily do since the links, N and Q, permit such movement. But the movement of the bracket K permitted by the link Q without moving the valve J does not change the angular position of the bracket and consequently does not move the valve or cause spreading movement of the tension adjusting pulleys.

If load is applied on the opposite cable of the pair the same effect occurs, except in this case the pulley-bracket also moves in the opposite direction, at right-angles to the cable.

A remaining condition to be considered is the travel of the cables during operation of the controls by the pilot. Such travel simply rotates the pulleys without affecting the position of the pulley-brackets, and consequently does not cause the governor to operate.

Since control cables are so vital to the safety of an airplane, subjecting them to the influence of any automatic apparatus involves the requirement, that failure of the automatic apparatus, however remote and improbable, must not render the cables manually inoperative, but they must at all times be under full manual control whether the automatic tension governor works or not. In my automatic cable tension governor as described and shown, if, for example, the hydraulic pressure supply fails, or the pipe-lines break, the governor will be rendered inoperative but the cables will remain intact and always under manual control of the pilot, and the offset in the cables caused by the tension adjusting pulleys will remain (thus preventing the cables slackening) because the wedge is a self-locking device, so that reliance is not made on the hydraulic locking of the piston.

The necessary pulleys and brackets and in the governor are no more vulnerable than the numerous pulleys and brackets in present cable installations required to lead the cables from the member to be operated to the point of operation accessible to the pilot.

If the electric power actuator shown in Fig. 2 is used in place of the hydraulic actuator of Fig. 1 the general operation of the governor would be the same. In this case, however, link G is connected to one end of a bell-crank 25 which is rockable on a fixed pivot 35, and the other end of the bell-crank is yoked as at 26 to embrace trunnion pins 27 projecting from the sides of a traveling nut 28 mounted on a threaded extension 29 of the shaft 30 of a reversing electric motor 31. Threaded shaft 30 has its outer end left unthreaded and is rotatably supported in a bearing 32.

Motor 31 is suitably fixed in position on the aircraft structure and is equipped with a suitable electric brake 37 of the well known type which automatically clamp the revolving parts against motion whenever the motor circuit current is broken for instant stopping thereof, and releases the rotor the moment the circuit is closed.

The motor is provided with a suitable reversing switch to be operated respectively by one, or the other way movement of the end of lever P. In the drawing this reversing switch is enclosed in a housing 33 and is indicated as a suitable switch with slidable actuating rod 34 extending out of the housing and pivotally connected to lever P of bracket K, all so that upon movement of lever P in either direction from central or initial position the motor will revolve either to the right or left as the case may be to carry the nut 28 in either direction to properly rock bracket A for restoring the initial cable tension, and when the original tension is restored, the reversing switch is at neutral center position. Numerous variations of the arrangement may be made by those skilled in the art.

A modification in the mounting of the tension adjusting pulleys 9 and 10 is shown in Fig. 3 and wherein the two pulleys are forced apart to spread and tension the cables by a double wedge block D' directly connected to the piston rod 12 of the power cylinder E for moving the wedge back and forth along suitable fixed guiding rollers or blocks 40. The outer edges of the wedge operate against bearings 42 in which the axles of pulleys 9 and 10 revolve, and the bearings may be stabilized by pivoted links 43 pivotally anchored at their outer ends 44 to a fixed point. It is of course understood that the wedge and bearings are at both sides of the pulleys.

In this showing the power cylinder E is positioned between the cables 1 and 2, and its valve J (not shown) would of course be positioned for connection to suitable operating linkage from bracket K as described for the showing of Fig. 1.

Since the angular relation of bracket-lever K with respect to the cable tension is definite with a certain adjustment of spring R, it follows that a pointer 23 extended from the bracket may be provided or the bracket linked to such a pointer at a remote point, to give a constant reading of the cable tension on a suitably graduated scale 24 if desired.

Having thus described my automatic cable tension maintaining governor and the manner of its operation as well as some of its modifications, it will be evident that various other modifications in its construction may be resorted to without departing from the spirit of the invention, and any such variations are intended to be embraced in the scope of my appended claims.

I claim:

1. An automatic cable tensioning apparatus comprising means movable in opposite directions for increasing or decreasing the tension in a pair of tensioned control cables depending on the direction of movement, a double acting power actuator arranged for operating said movable means in one direction for increasing the cable tension and in opposite direction for decreasing the tension, movable controlling means operated by pressure of deflection of said cables controlling the actuation of said actuator, and means balancing said movable controlling means in position with said actuator stopped when the tension of said cables is at a predetermined point.

2. An automatic cable tensioning apparatus comprising means movable in opposite directions for increasing or decreasing the tension in a pair of tensioned control cables depending on the direction of movement, a double acting power actuator arranged for operating said movable means in one direction for increasing the cable tension and in opposite direction for decreasing the tension, movable controlling means operated by pressure of deflection of said cables controlling the actuation of said actuator, and means balancing said movable controlling means in position with said actuator stopped when the tension of said cables is at a predetermined point, and means compensating for unequal deflection of said cables to insure substantially equal operating pressure from both cables on said controlling means.

3. An automatic cable tensioning apparatus comprising movable means for varying the tension in a pair of control cables, a double acting power actuator arranged for operating said movable means in one direction for increasing the cable tension and in opposite direction for decreasing the tension, movable controlling means operated by pressure of deflection of said cables controlling the actuation of said actuator, and means balancing said movable controlling means in position with said actuator stopped when the tension of said cables is at a predetermined point, and means for adjusting the tension value in said cables at which said movable controling means is balanced.

4. An automatic cable tensioning apparatus comprising movable means for varying the tension in a pair of control cables, a double acting power actuator arranged for operating said movable means in one direction for increasing the cable tension and in opposite direction for decreasing the tension, a self-locking member between said power actuator and said movable means locking the latter from independent movement, movable controlling means operated by pressure of deflection of said cables controlling the actuation of said actuator, and means balancing said movable controlling means in position with said actuator stopped when the tension of said cables is at a predetermined point.

5. An automatic cable tensioning apparatus for a pair of initially tensioned control cables comprising a first movable means arranged for deflecting the cables for varying their tension, power means for operating said first movable means, a second movable means deflecting said cables slightly at another point and arranged to operatively trip said power means, means tending to balance said second movable means against the force of the cables deflected by it, and transmission means operatively connecting said power means and said first movable means, said power means adjusted for stopping when said second movable means is in position of initial tension of said cables.

6. An automatic cable tensioning apparatus for a pair of initially tensioned control cables, comprising spaced supports guiding the cables in adjacent bights, a first rocking lever pivoted at a point between said cables arranged to bear against said cables to normally deflect both of them under said initial tension, a power actuator operatively connected to said first rocking lever for rocking the same to increase or decrease the deflection of said cables, a second rocking lever pivoted at a point between said cables arranged to bear against said cables, a spring urging said second rocking lever in direction deflecting said cables slightly, a starting and stopping control on said power actuator, and means connecting said second rocking lever for operating said control upon movement of said second rocking lever, due to changes in initial tension of said cables.

7. An automatic cable tensioning apparatus for a pair of initially tensioned control cables, comprising spaced supports guiding the cables in adjacent bights, a first rocking lever pivoted at a point between said cables arranged to bear against said cables to normally deflect both of them under said initial tension, a power actuator operatively connected to said first rocking lever for rocking the same to increase or decrease the deflection of said cables, a second rocking lever pivoted at a point between said cables arranged to bear against said cables, a spring urging said second rocking lever in direction deflecting said cables slightly, a starting and stopping control on said power actuator, and means connecting said second rocking lever for operating said control upon movement of said second rocking lever, due to changes in initial tension of said cables, the pivotal point of said second rocking lever being floatingly mounted for movement transversely of the run of said cables.

8. An automatic cable tensioning apparatus for a pair of initially tensioned control cables, comprising spaced supports guiding the cables in adjacent bights, a first rocking lever pivoted at a point between said cables arranged to bear against said cables to normally deflect both of them under said initial tension, a double acting hydraulic power actuator operatively connected to said first rocking lever for rocking the same to increase or decrease the deflection of said cables, a second rocking lever pivoted at a point between said cables arranged to bear against said cables, a spring urging said second rocking lever in direction deflecting said cables slightly, a starting and stopping control valve on said power actuator, and means connecting said second rocking lever for operating said control upon movement of said second rocking lever, due to changes in initial tension of said cables.

9. In the construction set out in claim 6, both of said rocking levers provided with idler pulleys bearing on the cables.

10. In the construction set out in claim 6, the operative connection of said power actuator to said first rocking lever including a wedge for transmitting motion, said wedge being of an angle to form a lock against independent motion of said first rocking lever upon stopping of said power actuator.

11. In the construction set out in claim 6, means for adjusting the tension of said spring to balance any desired initial tension in said cables with said second rocking lever in position for stopping said power actuator.

12. In an apparatus for automatically tensioning a pair of control cables, a pair of pulleys each bearing against one of said cables, a movable wedge member arranged for moving said pulleys to deflect said cables upon movement of said wedge, and a double acting power applicator connected to and for operating said wedge member.

13. In an apparatus for automatically tensioning a pair of control cables, a pair of pulleys each bearing against one of said cables, a movable wedge member arranged for spreading said pulleys to deflect said cables upon movement of said wedge, and a double acting power applicator connected to and for operating said wedge member, said wedge member formed with a wedging angle making it self locking against the pressure of said pulleys at any point of movement.

14. In an apparatus for substantially maintaining a predetermined tension in a tensioned operating cable, power means for applying or releasing the tension in said cable, movable means deflecting the tensioned cable from a straight run at a point intermediate its length, and means operated by the pressure of the deflection of the cable at said point arranged to control the application of said power means for increasing the tension in the cable when the pressure of said deflection falls below a predetermined value, and vice versa.

15. In an apparatus for substantially maintaining a predetermined tension in a tensioned operating cable, movable power operated means for deflecting said tensioned cable at a first point more or less from a straight run for thereby varying its tension, second movable means acting under a predetermined force deflecting said cable slightly at a second point in its run, and means operated by the movement of said second movable means through any varying tension of said cable controlling the application of said power operated means for deflecting said cable more at said first point as the deflection of the cable at said second point becomes greater and vice versa.

16. In an apparatus for substantially maintaining a predetermined tension in a tensioned operating cable, movable power operated means for deflecting said tensioned cable at a first point more or less from a straight run for thereby varying its tension, second movable means acting under a predetermined force deflecting said cable slightly at a second point in its run, and means operated by the movement of said second movable means through any varying tension of said cable controlling the application of said power operated means for deflecting said cable more at said first point as the deflection of the cable at said second point becomes greater and vice versa, and means for varying the force applied to said second movable means.

17. In a structure as set out in claim 5, means compensating for unequal deflection of said cables.

JOHN STURGESS.